April 30, 1935.  O. C. BRITSCH  1,999,801
ELECTRIC SWITCH
Filed Dec. 23, 1931
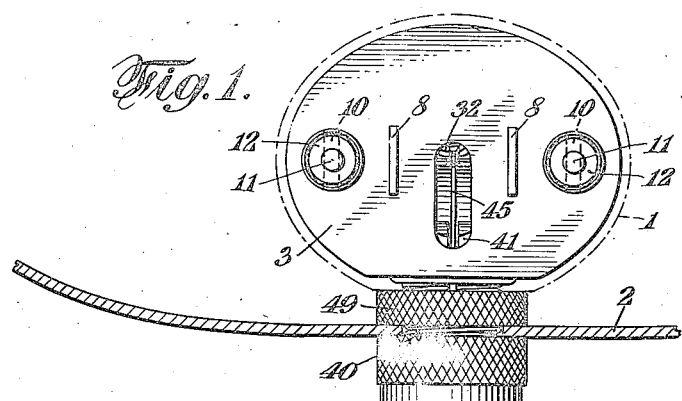
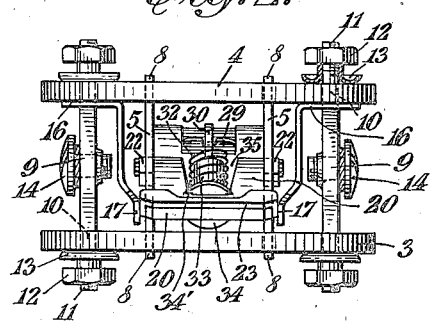
INVENTOR
Otto C. Britsch
BY
Gifford, Scull & Burgess
ATTORNEYS Patented Apr. 30, 1935

1,999,801

UNITED STATES PATENT OFFICE 1,999,801

ELECTRIC SWITCH

Otto C. Britsch, Woodhaven, N. Y., assignor to Henry Hyman, Brooklyn, N. Y.

Application December 23, 1931, Serial No. 582,699

9 Claims. (Cl. 200—67)

This invention relates to an electric switch that can be operated by a pull chain. The switch moves into its open position by snap action. The closed position is effected by a bridging member that bridges across the space between spring contacts. The switch may be enclosed in a housing and installed, for example, inside of a canopy.

The invention will be understood from the description in connection with the accompanying drawing in which Fig. 1 is a side view of the device showing a portion of a canopy; Fig. 2 is an end view with the housing removed; Fig. 3 is a section along the line 3—3 of Fig. 4; Fig. 4 is a side view with a member removed; Fig. 5 is a section along the line 5—5 of Fig. 4 with the switch in the closed position; Fig. 6 is a section similar to Fig. 5 with the switch in the open position, and Fig. 7 is a sectional view showing a modification of some of the parts.

In the drawing reference character 1 indicates a housing for the switch, which housing is merely indicated in dotted lines. The switch may be attached to a canopy 2, as most clearly indicated in Fig. 1.

The switch comprises side plates 3 and 4 of stiff insulating material, which plates may be oval-shaped as shown in Figs. 1 and 4. Spaced metal plates 5 extend across the space between the plates 3 and 4 perpendicular to them. The spaced plates 5 constitute the legs of a U-shaped member 6 and the edges 7 of the member 6 extend to the outer surface of the plates 3 and 4 as shown in Figs. 3 to 6. Projections 8 are provided along the edges of the plates 5, which projections extend through slots in the plates 3 and 4.

Spaced metallic holding members 9 extend between the plates 3 and 4 and hold them in spaced relation against the edges of the plates 5. The ends of the holding members 9 are reduced, as indicated at 10 leaving shoulders on the members 9. The reduced extending end portions 10 project through openings in the plates 3 and 4 and terminate in screw threaded portions 11 on which nuts 12 and washers 13 are placed to hold the parts assembled together, or the ends of these members may be upset or riveted thereby dispensing with the nuts and washers.

Binding screws 14 (Fig. 4) are screwed into the holding members 9 to retain the ends of the electric wires 15. Spring contacts 16 have flat ends at right angles to the body portion of the spring contacts through holes are provided for the reduced portions of the holding members 9 to pass through. The flat ends of the spring contacts 16 are held in place between the shoulders on the holding members 9 and the inside surfaces of the plate 4, and the shoulders at the other ends of the members 9 are pressed against the inside surfaces of the plate 3. The contacts 16 extend into the space between the plates 3 and 4 and have their ends 17 bent toward each other (Figs. 2 and 4).

A plate 20 of insulating material is pivoted between the plates 5 and is journalled in openings 21 (Fig. 3) therein by means of pivots or extensions 22 on the edges of the plate 20 near its lower end. The openings 21 are shaped so that they may limit the extent of movement of the plate 20 in opposite directions, as shown in Fig. 3. A metal strip 23 is carried at the upper end of the plate 20 to bridge across the ends 17 of the contacts 16.

A metal plate 26 is journalled in openings 27 in the plates 5 below the openings 21. Pivots or extensions 28 are provided at the middle of the edges of the plate 26 for the holes 27, these pivots being preferably rounded, as shown in Figs. 3, 5 and 6. These pivots 28 may be made by bending the metal forming the extensions.

The plate 26 is bent back upon itself from one edge to the middle thereof and thence at right angles to form the projection 29. A pin 30 is pivoted on the projection 29, this pin 30 having an enlarged lower end with a hole 30' therethrough with the metal on opposite sides of this hole extending through a hole 29' in the projection 29 as the pin 30 pivots on this projection.

The pin 30 is provided with a shoulder 31 against which one end of a compression coil spring 32 rests. The pin 30 extends into the lower open end of a metal cylinder 33, with the coil spring 32 extending around this cylinder and having its upper end resting against the outwardly flared upper end 34 of the cylinder 33. The pin 30 moves back and forth in the cylinder 33 as the switch moves back and forth. A slot 35 is provided in the plate 20 from its lower pivoted end, in which slot the cylinder 33 is mounted with its flared end or flange 34 resting against the end of the slot 35. The diameter of the flared end 34 of the cylinder 33 is greater than the width of the slot 35 at its upper end and notches 34' are provided in this flared end on opposite sides to receive the edges of the slot 35 or material of the plate 20 and thus keep the upper end of the cylinder 33 in place and permit slight pivoting or tilting of the same in the slot 35.

A hollow threaded extension 40 extends through the base of the U-shaped member 6 and may be securely attached thereto by soldering, as indicated at 39. The upper end 41 of the extension 40 extends between the plates 3 and 4 and also between the plates 5 with opposite sides thereof beveled to provide stops for the plate 26. A transverse slit 42 is provided in the upper end of the extension 40 for a purpose to be described.

An annular shoulder 43 is provided in the extension 40 for the lower end of a compression spring 44. A strip 45 of thin metal is provided for operating the plate 26. The lower end 46 of the strip 45 is bent to form a spherical seat for the end ball of a pull chain of the well-known type and also to serve as a bearing against which the upper end of the compression spring 44 presses. The strip 45 extends through the slit 42 and is provided with a rounded head 47 having shoulders on opposite sides of the strip near the upper end thereof to catch the edges of the plate 26 and turn it when the chain is pulled. The pull chain 48 passes through the hollow extension 40 so that it will be accessible for the operator. A clamp nut 49 and lock nut 50 may be provided upon the extension 40 to hold the switch against the canopy 2.

The operation is as follows:

When the switch is in the position shown in Figs. 2 to 5 the circuit is closed from one of the electric wires 15 through one of the holding members 9, spring contact 16, metal bridging member 23, the other spring contact 16, the other member 9 to the other wire 15. In this position the upper end or rounded head 47 of the strip 45 extends beyond the left-hand edge (Fig. 5) of the pivoted plate 26 with one of the shoulders at the head extending over the edge of this plate. A pull on the chain 48 turns the plate 26 in an anti-clockwise direction. (Fig. 5.) The movement of the plate 26 and extension 29 in the anti-clockwise direction compresses the spring 32 and causes the pin 30 to move inwardly in the cylinder 33. As soon as the pivot point between the lower end of the pin 30 and the extension 29 passes beyond the dead center in the plane passing through the center of the upper end of the cylinder 33 and the pivots 28 the spring expands and causes the plate 20 to turn clockwise about its pivots 22 into the position shown in Fig. 6, thus opening the circuit as the bridging member 23 moves away from the ends 17 with a snap action. The limit of movement of the plate 20 in opposite directions may be determined either by the sides of the extensions 22 striking edges of the opening 21 or by the upper end of the plate 20 or bridging member 23 striking the inside surfaces of the plates 3 and 4, respectively.

The downward pull on the chain 48 turns the plate 26 as described. When the left-hand edge of this plate descends a certain distance the shoulder at the head 47 of the strip 26 slides off of the edge of the plate 26. Further downward pull on the chain 48 carries the head 47 below the lowermost edge of the plate 26 and the strip 45 assumes a vertical position or a position to cause the head 47 to be to the right of the left-hand edge of the plate 26. This may be produced, for example, either by the left-hand edge of the strip 45 striking the lower end of the slit 42, or by having a stop such as an annular shoulder along the inside surfaces of the opening in the extension 40. In the illustrative embodiment of the invention the convolutions of the spring 44 lie against each other in the furthermost downward position of the strip 45 and operate as a stop or fulcrum to turn the strip 45 to its vertical position when its edge strikes the upper surface of the uppermost spring convolution.

When the tension is released from the chain 48 the spring 44 projects the strip 45 upwardly in a vertical direction causing its rounded head to slide upwardly toward the right along the lower side of the plate 26 until the head 47 passes beyond the other edge of the plate 26, as shown in Fig. 6 and the other shoulder on this strip extends over this edge preparatory to moving it downwardly when tension is again applied to the chain 48. A pull on the chain 48 with the parts in the position shown in Fig. 6 tilts the plate 26 to close the switch in a manner similar to that already described for opening it.

In the modification shown in Fig. 7, a hollow plug 51 is inserted into the lower end of the hollow extension 40. It may be a split plug and held in position by friction or it may be a screw plug. The rim 52 thereof contacts with the end of the extension 40 and the annular shoulder 53 inside the plug 51 serves as a stop for the lower end of the spring 44. The spring 44 is compressed by pulling the chain 48 into the plug 51 until the flange 54 on the strip 45 strikes the inner end of the plug 51, thus turning the strip 45 to its vertical position. The operation is similar to that already described.

I claim:

1. In an electric switch, a plate journalled at its ends, a projection at its middle portion, an elongated plate operating member having an enlarged head at its end, and means for reciprocating said member and causing opposite sides of its head to contact with opposite edges of said plate at successive reciprocations.

2. In an electric switch, a plate journalled at its ends, a projection at its middle portion, an elongated plate operating member having shoulders to engage opposite edges of said plate alternately, and means to cause said shoulders to move across said plate from one edge thereof to the other.

3. In an electric switch, a plate journalled at its ends, a projection at its middle portion, an elongated plate operating member having shoulders to engage opposite edges of said plate alternately to operate said plate by pulling it, and means to cause said shoulders to slide off of said edges when said plate has been turned to certain positions.

4. In an electric switch, a plate journalled at its ends, a projection at its middle portion, an elongated plate operating member having shoulders to engage opposite edges of said plate alternately, means to cause said shoulders to slide off of said edges when said plate has been turned to certain positions, and means to cause said shoulders to move to the other edge when they slide off of either one of them.

5. In an electric switch, a plate, journalled at its ends, a projection at its middle portion, an elongated plate operating member having shoulders to engage opposite edges of said plate alternately, means to cause said shoulders to slide off of said edges when said plate has been turned to certain positions, and means to cause said plate to snap into positions.

6. In an electric switch, a plate journalled at its ends, a projection at its middle portion, an elongated plate operating member having an enlarged head, means for reciprocating said member and causing opposite sides of its head to contact with opposite edges of said plate at successive reciprocations, and means to cause said member to extend in the direction of its reciprocation when it reaches one extreme of its movement.

7. In an electric switch, a pair of spaced plates of insulating material, and a U-shaped member of flat metal between said plates with its edges contacting with the facing sides of said insulating plates, the edges of the bight of said U-shaped member extending outwardly beyond the facing sides of said insulating members.

8. In an electric switch, a pair of spaced plates of insulating material, a U-shaped member of flat metal between said plates with its edges contacting with the facing sides of said insulating plates, the edges of the bight of said U-shaped member extending outwardly beyond the facing sides of said insulating members, a contact bridging member and an operating member for said contact bridging member carried by said U-shaped member.

9. In an electric switch, a pair of spaced plates of insulating material, a U-shaped member of flat metal between said plates with its edges contacting with the facing sides of said insulating plates, the edges of the bight of said U-shaped member extending outwardly beyond the facing sides of said insulating members, a contact bridging member, an operating member for said contact bridging member carried by said U-shaped member, transverse retaining members for said insulating plates, and contacts supported on said transverse members.

OTTO C. BRITSCH.